Feb. 14, 1961 J. W. WEST 2,971,260

AIRCRAFT DRIFT SIGHT AND POSITION FINDER

Filed April 27, 1955 2 Sheets-Sheet 1

MILES 0 .5 1 1.5 2 2.6
THOUSANDS OF YARDS 0 1 2 3 4 5
THOUSANDS OF FEET

INVENTOR
JUSTON W. WEST

BY

ATTORNEYS

AIRCRAFT DRIFT SIGHT AND POSITION FINDER
Filed April 27, 1955 2 Sheets-Sheet 2
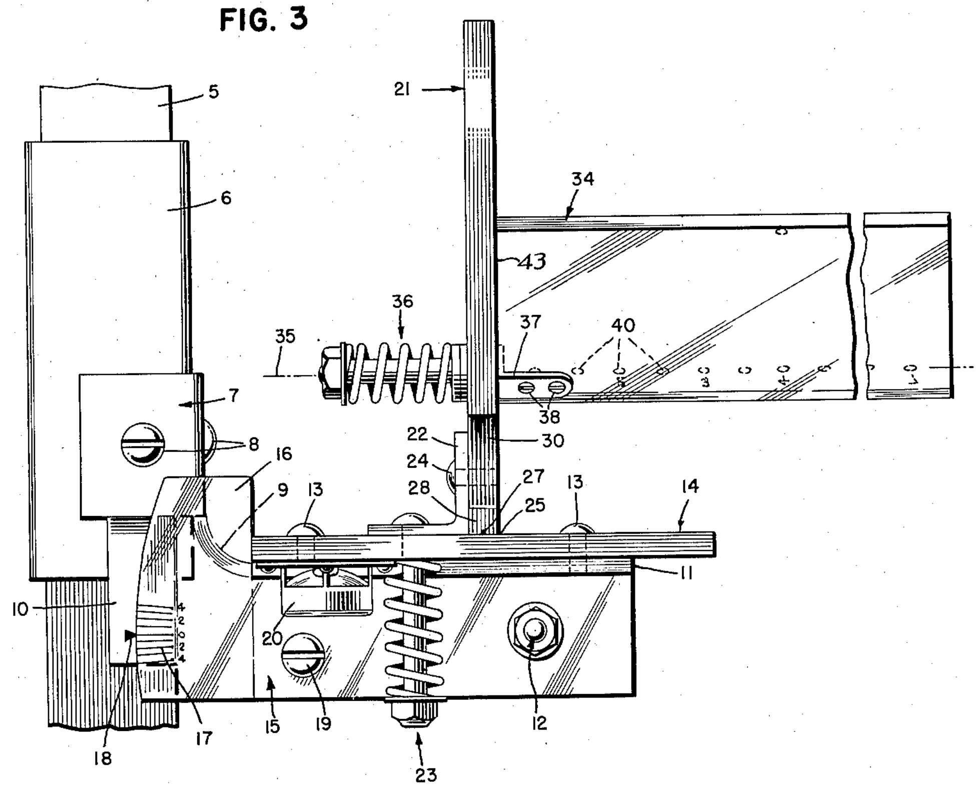
INVENTOR
JUSTON W. WEST
BY G. W. O'Brien
Q. Baxter Warner
ATTORNEYS 2,971,260
Patented Feb. 14, 1961

2,971,260

AIRCRAFT DRIFT SIGHT AND POSITION FINDER

Juston W. West, Honolulu, Hawaii (% Bureau of Naval (Officer) Personnel, Navy Department, Washington 25, D.C.)

Filed Apr. 27, 1955, Ser. No. 504,386

4 Claims. (Cl. 33—46)

(Granted under Title 35, U.S. Code (1952), sec. 266)

The invention described herein may be manufactured and used by or for the Government of the United States of America for governmental purposes without the payment of any royalties thereon or therefor.

The present invention relates to navigation instruments, and more particularly to a combination position finder and drift indicator for position sights for computing problems in aircraft navigation.

Drift indicators and position finders exemplified by the prior art generally comprise a substantially flat planar structure having several different scales arranged concentrically for relative rotation one with another. The concentric scales of these devices are manipulated to solve for unknown quantities by the setting of known factors on the various scales in a manner similar to that of the common circular slide rule. Such devices usually are required to be mounted in the floor of the aircraft and normally include track wires or straight edges mounted on transparent rotatable disks or plates, or may employ lines etched in glass or plastic overlay sheets. These wires or the like are aligned with objects on the ground immediately below the plane such that the apparent movement of the object is along the wire. The measurement of the angle formed by the heading or longitudinal center line of the aircraft and the wire establishes the angle of drift of the aircraft. Aircraft which carry such indicators necessarily must pass directly over the ground points to compute navigation problems such as the drift angle, and previous attempts to incorporate sight lines in a nonvertical plane have made it necessary to plot the angle of drift on a computing board removed from the sight plane of the indicator. Since conventional drift sights are normally inconveniently located in the floor of an aircraft or at a station which is positioned at a distance from the navigation computing board, the pilot could not both take the sight readings and do related computation of navigation problems without the assistance of other personnel.

The present invention makes possible the reading of drift substantially instantaneously by the pilot while flying solo without undue concentration of the pilot.

It is therefore an object of the present invention to provide an instrument that can be used to solve navigation problems by a pilot flying solo.

Another object of the present invention is to provide a position indicator which enables the instantaneous reading of the distance to be traveled before passing one side of an object, and the horizontal distance the aircraft will be from an object when passing it.

A further object of the present invention is the provision of a device for predetermining a "fixed" relative position, and to determine a "fix" in actual distance rather than relative bearing to preclude further navigation computation.

Still another object is to provide a device to determine the track and the ground speed of an aircraft.

A further object is the provision of a drift sight indicator which is capable of being operated in a position convenient for the pilot or navigator.

Another object is to provide a drift sight indicator having an inclined sighting plane which may be used to obtain drift data from ground objects which are not in alignment with the flight path of the aircraft.

Another object is to provide a device to indicate in degrees an aircraft's longitudinal trim.

Other objects and many of the attendant advantages of this invention will be readily appreciated as the same becomes better understood by reference to the following detailed description when considered in connection with the accompanying drawings wherein:

Fig. 3 is a front elevation view of the device shown in Figs. 1 and 2.

Figures 1, 2:
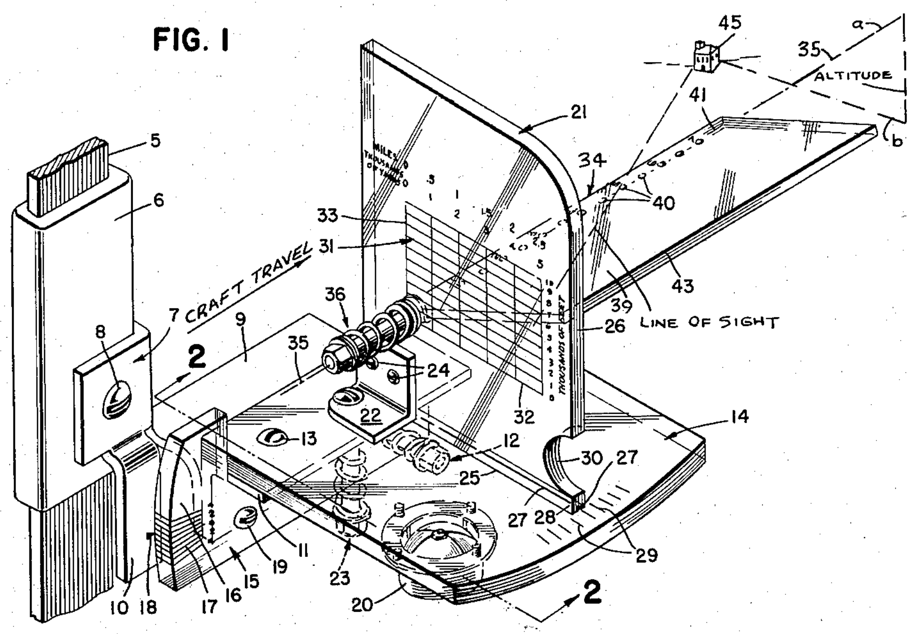
Fig. 1 illustrates an isometric view of a preferred embodiment of the invention.
Fig. 2 is an enlarged side view partially in section taken substantially along the line 2—2 of the device shown in Fig. 1.

In the drawings, wherein like reference characters designate like or corresponding parts throughout the several views, Fig. 1 illustrates the preferred embodiment having a standard 5 which vertically supports a channel 6 which is slidably mounted thereon. A support angle bracket 7 is fixedly engaged to channel 6 by suitable means such as screws 8. Bracket 7 is formed to provide a laterally extending angle bar 9 perpendicular to standard 5 and parallel to the longitudinal axis of the craft, and a depending tab 10 parallel with standard 5.

An angular support member 11 is mated to the adjacent surface of the vertical portion of angle bar 9 for rotation about a horizontal axis which passes through the center line of a coupling means such as the spring and bolt arrangement 12 which frictionally positions adjacent surfaces of member 11 and bar 9 together, as best shown in Fig. 2. To the horizontal surface provided by support member 11 is rigidly connected by suitable means such as screws 13 a horizontal plate 14 which is stationed to extend in a lateral plane with respect to vertical standard 5. Lying adjacent and matched to the vertical portion of support member 11 is a trim indicator 15 which is formed such that a vertically upstanding indicating section 16 is made preferably integral with the remainder of the indicator. Section 16, which rises above and at one side of horizontal plate 14 for access for adjustment, has provided on the surface thereof a trim angle scale 17 to indicate the trim angle of the aircraft in degrees and is indexed to a zero degree mark 18 located on tab 10. Trim indicator 15 is fixedly engaged to support member 11 by conventional means such as screw 19, as illustrated in Figs. 1 and 3 of the drawings, and is further attached to angle bar 9 for rotation thereabout on a horizontal axis simultaneously and on the same axis with support member 11 and plate 14 by the coupling provided by the spring and bolt arrangement 12, shown best by Fig. 2. A circular dome-type spirit level 20 is firmly connected to the undersurface of plate 14 to give visual aid in the establishment of plate 14 to the horizontal plane when desired for the solution of certain navigation problems.

As shown in various perspectives of Figs. 1, 2, and 3, a vertical plate 21 is suitably connected to horizontal plate 14 by means of an angle strap 22. A spring and bolt arrangement 23 passes through the horizontal leg of strap 22 and further through a passage provided in horizontal plate 14 to frictionally connect plate 21 vertically on plate 14. The vertical leg of strap 22 is fixedly engaged to plate 21 by conventional means such as screws 24. The vertical plate 21 is coupled to plate 14 in a manner such that the lower edge 25 of plate 21 swings an arc on plate 14, the arc being centered at the location of the bolt arrangement 23. Vertical edge 26 of plate 21 contains a marking 27 at the lowermost outer corner 28 thereof and the marking is made visible by suitable means such as etching or inking. Marking 27 is provided to describe an arc overlying a drift angle scale 29, Fig. 1, located on the surface of horizontal plate 14. To aid in the reading of the marking 27 relative to scale 29 a crescent indentation 30 is formed into plate 21 slightly above the lowermost outer corner 28 of vertical edge 26.

As shown by Figs. 1 and 2 a rectangular coordinate grid 31 is substantially centered in vertical plate 21 and is furnished with a horizontally positioned *x*-axis 32 ruled in increments of thousands of yards and also in nautical miles. The *y*-axis 33 of grid 31 is scaled in increments of thousands of feet of altitude for a purpose to be described hereinafter.

In Figs. 1, 2, and 3 is shown a tilt plate 34 which rotates about a horizontal axis 35 perpendicular to the horizontal axis of rotation of horizontal plate 14. Axis 35 is adjusted to extend through the origin of the *x* and *y* axes of grid 31 on vertical plate 21.

The tilt plate 34 is connected for swinging motion about axis 35 to vertical plate 21 by suitable means such as the spring and bolt arrangement 36 which bolt arrangement connects an "L" strap 37, Fig. 3, with plate 21. The "L" strap 37 is firmly mated to tilt plate 34 by means such as screws 38. The upper surface 39 of tilt plate 34 has provided thereon protuberances 40 equally spaced along a construction line 41 which is superjacent axis 35. These protuberances are used to indicate miles of distance the sighted object is ahead of the aircraft along the flight path, as indicated by line "*a*" which is an extension of axis 35 as shown in Fig. 1 of the drawings.

Referring again to Fig. 1, the operation of the present invention to solve navigation problems is as follows:

To compute the distance or length of "*a*," which is the distance the aircraft utilizing the device of the instant invention must travel before passing a ground object 45 located below and to the left of the aircraft, and "*b*," which is the lateral distance the aircraft will be from the ground object 45 when the aircraft passes the latter, the pilot of the aircraft merely rotates the tilt plate 34 about the axis 35 until the upper surface 39 of plate 34 is aligned with the ground object 45 such that the object 45 appears to be constrained solely to motion along the plane of surface 39. A typical line of sight for achieving such alignment of the ground object 45 in the plane of surface 39 is illustrated in Fig. 1 of the drawings.

Distance "*b*" is determined by the latter sighting alone and a notation of the altitude of the aircraft from some source other than the instant device, such as an altimeter, and may now be read directly from the *x*-axis scale coordinate of grid 31 at the point where the upper surface 39 of plate 34, as seen by viewing through the grid 31, intersects the known altitude as indicated along the *y*-axis ordinate lines of grid 31. An example of the solution for the distance "*b*," using the Fig. 2 representation of the vertical plate 21 and the tilt plate 34 in their relative positions shown, would be the following:

Assume the altitude, as given by an altimeter reading or the like, is approximately 4100 feet. After alignment of object 45 onto the surface 39 of tilt plate 34, and by observing grid 31, it is found that the *y*-axis 4100 feet altitude ordinate line intersects the upper surface 39 of plate 34 at a point whose grid 31 *x*-axis coordinate is 1.5 nautical miles, the length of the distance "*b*." Thus, it is important to note that one does not need to sight through plate 21 for reading out the distance "*b*."

Distance "*a*" may now be determined by additionally sighting the object 45 through vertical plate 21, from the point on grid 31 where the known altitude ordinate line intersects the upper surface 39 of plate 34, and noting the reading taken to the object along the axis 35 as indicated by the calibrated protuberances 40. Inasmuch as the calibrated protuberances 40 are proportional to the distance "*a*" shown in Fig. 1, they provide a direct scale reading in nautical miles of that distance. Since the distance "*a*" in miles to travel before passing at one side at right angles to the object 45 is found by this method, and the time to travel this distance "*a*" can be recorded, the ground speed of an aircraft utilizing the device of the instant invention can be derived by simple mathematics.

Hence, the distinction that the distance "*b*" is determined from the *x*-axis distance scale of grid 31, while the distance "*a*" is determined from the protuberance marked scale of plate 34 while sighting the ground object 45 through the grid 31.

When the invention is used to discover distances such as "*a*" and "*b*" of Fig. 1, the scales may be changed on grid 31 and the protuberances 40 as the problem demands. For example, the device may be used at any altitude or range simply by using an equal multiple or fraction on distance, altitudes, or range data. As shown in Fig. 2, the *y*-axis of grid 31 is divided in units of from 0 to 10 in altitude, and the *x*-axis in units of from 0 to 5 in distance. If flying at an altitude of 20,000 feet using an altitude mark of 10, distance to one side, "*b*" of Fig. 1, will be twice the indicated distance; distance forward, "*a*" of Fig. 1, to an object will also be twice the indicated distance.

Since the drift angle of the aircraft may be compensated by the alignment of the ground object onto the surface 39 of tilt plate 34, all data is readable as to heading or as to "track" without any computation. By changing the heading of the aircraft to traverse a course described by presetting of the tilt plate 34 on an object a known distance, "*b*," out from intended track, the pilot needs only to read his compass and he has the compass course to the objective; known and unknown variation and deviation, and drift are all compensated for by the relative settings of plates 14, 21, and 34. The drift angle is set by the position of vertical plate 21 on horizontal plate 14 as read on scale 29, and may be used for reference and for checking changes in the drift angle.

As a drift sight the instant invention makes possible the reading of drift instantaneously by the pilot. Drift can be calculated on any object or objects to the right or to the left of the aircraft at any altitude. It is not necessary for the aircraft to pass over the sighted object, and, in addition, the visible surface of a body of water also can be used as an object in the calculation of drift. This method of calculating drift is possible because the angle formed in the horizontal plane between the heading of the aircraft and the track, namely the drift angle, is the same when the plane of sight, plate 34, which passes through the track and the object sighted, is either at an oblique or right angle to the horizontal plane. In sighting drift the drift angle is indicated when the vertical plate 21 is turned to the right or to the left of the longitudinal center line of the aircraft as indicated on scale 29 in order to cause sighted objects to apparently travel along or parallel to a longitudinal edge of plate 34.

The trim indicator 15 is used to establish plate 14 in the horizontal plane by setting the scale 17 at a trim angle in opposition to that of the aircraft. The angle of trim, that is, the angle that the attitude of the longitudinal axis of the aircraft makes with respect to the horizontal plane, is obtained from the trim indicator instrument of the aircraft, for example, and the trim indicator adjusted so as to bring plate 14 to the horizontal plane.

After establishing a course setting of the proper sight on tilt plate 34, one needs only to fly the passing objects apparent down the surface 39 of tilt plate 34 to reach the objective.

The present invention was devised as a three dimensional navigation and mathematical calculator to solve navigation problems such as drift, position, ground speed, and track without the necessity of plotting and undue concentration thereby allowing a solo flier to fly and to navigate at the same time without assistance.

Obviously many modifications and variations of the present invention are possible in the light of the above teachings. It is therefore to be understood that within the scope of the appended claims the invention may be practiced otherwise than as specifically described.

What is claimed is:

1. An aircraft navigation computer comprising; a first horizontally positionable plate having drift indicia thereon, a second plate vertically disposed on said first plate and pivotally mounted thereon for rotation about a vertical axis and formed to provide a marker for said drift indicia, said second plate having provided thereon a graph scaled in distance and in altitude, and a sight plate perpendicularly mounted on said second plate and tiltable about a horizontal axis through the origin of said graph, the attitude of said sight plate while sighting an object being readable on said graph to determine the lateral horizontal distance perpendicular to and between the sighted object and the intended track of the aircraft.

2. An aircraft navigation computer comprising; a frame, a first horizontally positionable plate pivotably mounted on said frame, a second transparent plate vertically disposed on said first plate and pivotally mounted thereon for rotation about a vertical axis, and a third plate pivotably mounted perpendicularly on said second plate and having a horizontal axis of rotation, said third plate having protuberances formed superjacent said horizontal axis of rotation thereof whereby the relationship of said protuberances with respect to a sighted object apparently traveling along said third plate provides a measurement of a distance the aircraft has traveled and simultaneously the distance to be traveled to pass the sighted object.

3. An aircraft navigation computer comprising; a frame, a first horizontally positionable plate pivotably mounted on said frame, a trim angle indicator pivotably connected to said frame for rotation about a horizontal axis simultaneously with said plate, a second transparent plate vertically disposed on said first plate and pivotally mounted thereon for rotation about a vertical axis, and a third plate pivotably mounted perpendicularly on said second plate and having a horizontal axis of rotation, said third plate having protuberances formed superjacent said horizontal axis of rotation thereof whereby the relationship of said protuberances with respect to a sighted object apparently traveling along said third plate provides a measurement of a distance the aircraft has traveled and simultaneously the distance to be traveled to pass the sighted object.

4. An aircraft navigation computer comprising; a vertical standard, bracket means slidably connected to said standard and formed to have a depending tab portion in parallel aligned relationship with said standard and a lateral angle bar perpendicular to said standard, a trim indicator mounted on the angle bar of said bracket means for rotation about a horizontal axis and having a trim angle scale on one portion thereof located adjacent the depending tab portion of said bracket means to indicate degrees of trim of the aircraft, said depending tab portion having a reference mark to which is related the trim angle scale of said trim indicator, a horizontally positionable plate connected to said trim indicator for simultaneous movement therewith about a common horizontal axis passing through the angle bar of said support bracket, a spirit level positioned on said plate to visually assist in horizontally positioning of said plate, a drift angle scale positioned on said plate, a vertical plate having a grid of rectangular coordinates located on the vertical surface thereof and mounted upon said horizontally positionable plate for sweeping movement about a vertical axis over the surface thereof and over said drift angle scale at the lowermost outer corner of said vertical plate, and a tilt plate laterally and perpendicularly positioned with respect to the surface of said vertical plate and fastened to said vertical plate for movement about a horizontal axis passing through the origin of the grid of said vertical plate.

References Cited in the file of this patent

UNITED STATES PATENTS

| | | |
|---|---|---|
| 462,234 | Brotherhood | Nov. 3, 1891 |
| 533,340 | Beehler | Jan. 29, 1895 |
| 752,962 | Eby | Feb. 23, 1904 |
| 1,010,339 | Angel | Nov. 28, 1911 |
| 1,089,969 | Schmid | Mar. 10, 1914 |
| 1,324,729 | Clementz | Dec. 9, 1919 |
| 1,389,555 | Smith et al. | Aug. 30, 1921 |
| 1,625,060 | Storm | Apr. 19, 1927 |
| 2,519,532 | Zerbee | Aug. 22, 1950 |
| 2,564,981 | Knecht | Aug. 21, 1951 |

FOREIGN PATENTS

| | | |
|---|---|---|
| 793,973 | France | Dec. 2, 1935 |
| 493,978 | Great Britain | Oct. 18, 1938 |